United States Patent
Wu et al.

(10) Patent No.: US 11,129,187 B2
(45) Date of Patent: Sep. 21, 2021

(54) NETWORK-ASSISTED SIDELINK SCHEDULING TECHNIQUES

(71) Applicant: QUALCOMM Incorporated, San Diego, CA (US)

(72) Inventors: Zhibin Wu, Sunnyvale, CA (US); Hong Cheng, Bridgewater, NJ (US); Kapil Gulati, Hillsborough, NJ (US); Sudhir Kumar Baghel, Hillsborough, NJ (US); Junyi Li, Chester, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 16/540,441

(22) Filed: Aug. 14, 2019

(65) Prior Publication Data

US 2020/0059954 A1 Feb. 20, 2020

Related U.S. Application Data

(60) Provisional application No. 62/719,521, filed on Aug. 17, 2018.

(51) Int. Cl.
*H04W 72/14* (2009.01)
*H04W 72/04* (2009.01)
(Continued)

(52) U.S. Cl.
CPC ........... *H04W 72/14* (2013.01); *H04L 1/0003* (2013.01); *H04W 4/40* (2018.02); *H04W 28/0278* (2013.01); *H04W 72/044* (2013.01)

(58) Field of Classification Search
CPC ............. H04L 1/0003; H04L 25/0224; H04W 28/0278; H04W 4/40; H04W 72/042; H04W 72/14; H04W 88/10; H04W 72/044
(Continued)

(56) References Cited

U.S. PATENT DOCUMENTS

| 2015/0327297 | A1* | 11/2015 | Nilsson | H04W 72/1215 370/336 |
| 2018/0070369 | A1* | 3/2018 | Papasakellariou | H04L 5/0053 |
| 2018/0191473 | A1* | 7/2018 | Ashraf | H04L 5/0064 |

OTHER PUBLICATIONS

Catt: "On LTE Uu and NR Uu Control NR Sidelink in NR V2X", 3GPP TSG RAN1 Meeting #94, 3GPP Draft; R1-1808404, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018 (Aug. 11, 2018), 4 Pages, XP051515786, Retrieved from the Internet: URL: http://www.3gpp.org/ftp/tsg%5Fran/WG1%5FRL1/TSGR1%5F94/Docs/R1%2D1808404%2Ezip [retrieved on Aug. 11, 2018] section 2.4.

(Continued)

*Primary Examiner* — Gbemileke J Onamuti
(74) *Attorney, Agent, or Firm* — Loza & Loza, LLP

(57) ABSTRACT

Aspects directed towards a network-assisted sidelink scheduling operation are disclosed. In one example, a scheduled entity receives a grant of resources from a scheduling entity operating according to a legacy radio access technology (RAT), and translates the grant of resources from a legacy configuration of resources to a non-legacy configuration of resources. The scheduled entity then performs a sidelink communication via the non-legacy configuration of resources. In another example, a scheduling entity operating according to a legacy RAT transmits a system information block (SIB) to a scheduled entity indicating that the scheduling entity can allocate non-legacy resources. The scheduling entity then receives a request for resources from the scheduled entity that corresponds to a non-legacy sidelink communication, and provides a grant of resources to the scheduled entity that includes a non-legacy-specific frequency for transmitting the non-legacy sidelink communication.

29 Claims, 13 Drawing Sheets

(51) Int. Cl.
H04W 4/40 (2018.01)
H04W 28/02 (2009.01)
H04L 1/00 (2006.01)

(58) Field of Classification Search
USPC .......................................................... 370/329
See application file for complete search history.

(56) References Cited

OTHER PUBLICATIONS

CMCC: "Discussion on NR Uu Control LTE Sidelink", 3GPP TSG RAN WG1 Meeting #94, 3GPP Draft; R1-1808839, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018 (Aug. 11, 2018), 2 Pages, XP051516212, Retrieved from the Internet: URL: http://www.3gpp.org/ftp/tsg%5Fran/WG1%5FRL1/TSGR1%5F94/Docs/R1%2D1808839%2Ezip [retrieved on Aug. 11, 2018] sections 1 and 2.

Huawei: "Feature Lead Summary for AI 7.2.4.3: Uu-Based Sidelink Resource Allocation/Configuration", 3GPP TSG RAN WG1 Meeting AH-1901, 3GPP Draft; R1-1901316, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, Jan. 21, 2019 (Jan. 21, 2019), 11 Pages, XP051601258, Retrieved from the Internet: URL: http://www.3gpp.org/ftp/tsg%5Fran/WG1%5FRL1/TSGR1%5FAH/NR%5FAH%5F1901/Docs/R1%2D1901316%2Ezip [retrieved on Jan. 21, 2019] sections 1, 2.1.3, 2.1.5 and 4.3.1 to 4.3.3.

International Search Report and Written Opinion—PCT/US2019/046628—ISA/EPO—dated Oct. 21, 2019.

Nokia, et al., "Initial View on NR V2X Sidelink Physical Layer Structures and Procedures", 3GPP TSG RAN WG1 Meeting #94, 3GPP Draft; R1-1809045-Initial View on NR V2X Sidelink Physical Layer Structures and Procedures, 3rd Generation Partnership Project (3GPP), Mobile Competence Centre; 650, Route Des Lucioles; F-0692 vol. RAN WG1, No. Gothenburg, Sweden; Aug. 20, 2018-Aug. 24, 2018, Aug. 11, 2018 (Aug. 11, 2018), 7 Pages, XP051516417, Retrieved from the Internet: URL: http://www.3gpp.org/ftp/tsg%5Fran/WG1%5FRL1/TSGR1%5F94/Docs/R1%2D1809045%2Ezip [retrieved on Aug. 11, 2018] p. 2, section "numerology for sidelink".

ZTE: "Discussion on Sidelink Resource Request Mechanism in PC5 CA", 3GPP Draft; R2-1713072, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, 7 Pages, XP051371900, Retrieved from the Internet: URL: http://www.3gpp.org/ftp/tsg%5Fran/WG2%5FRL2/TSGR2%5F100/Docs/ [retrieved on Nov. 17, 2017] section 2.1.

* cited by examiner

NETWORK-ASSISTED SIDELINK SCHEDULING TECHNIQUES

CROSS-REFERENCE TO RELATED APPLICATION(S)

This application claims priority to and the benefit of U.S. Provisional Patent Application No. 62/719,521, filed on Aug. 17, 2018, the entire content of which is incorporated herein by reference as if fully set forth below in its entirety and for all applicable purposes.

TECHNICAL FIELD

The technology discussed below relates generally to wireless communication systems, and more particularly, to network-assisted sidelink scheduling techniques, some of which may be applicable to New Radio (NR) sidelink scheduling operations for legacy base stations (e.g., a Long Term Evolution (LTE) eNB, etc.).

INTRODUCTION

Sidelink communications were initially introduced as a Long Term Evolution (LTE) feature directed towards enabling device-to-device (D2D) communications within legacy cellular-based LTE radio access networks. For comparison, in a legacy uplink/downlink, two UEs communicate through the Uu interface and data traverses the LTE eNB, whereas a sidelink enables the direct communication between proximal UEs using the newly defined PC5 interface so that data does not need to go through the eNB.

Sidelink communications will continue to be supported by 5G New Radio (NR) networks. However, due to the limited deployment of NR gNBs, it is anticipated that an NR PC5 capable UE will often operate under the coverage of an LTE eNB. Accordingly, it would be desirable to ensure that such UEs may perform NR sidelink communications while operating under the coverage of an LTE eNB.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduled entity (e.g., a user equipment (UE)) are disclosed. In a particular example, a method performed by a scheduled entity is disclosed, which includes receiving a grant of resources from a scheduling entity operating according to a first radio access technology (RAT), e.g., Long Term Evolution (LTE), and translating the grant of resources from a configuration of resources associated with the first RAT to a configuration of resources associated with a second RAT, e.g., New Radio (NR). The method further includes performing a sidelink communication via the configuration of resources associated with the second RAT.

In another aspect, a scheduled entity is disclosed. The scheduled entity can include each of a receiving circuitry, a translating circuitry, and a sidelink circuitry. For this example, the receiving circuitry can be configured to receive a grant of resources from a scheduling entity operating according to a first RAT (e.g., LTE), whereas the translating circuitry can be configured to translate the grant of resources from a configuration of resources associated with the first RAT to a configuration of resources associated with a second RAT (e.g., NR). The sidelink circuitry can be configured to perform a sidelink communication via the configuration of resources associated with the second RAT.

Various aspects directed towards a scheduling entity (e.g., a base station) operating according to a first RAT (e.g., LTE) are also disclosed. In a particular example, a method performed by a scheduling entity (e.g., an LTE scheduling entity) is disclosed, which includes transmitting a system information block (SIB) to a scheduled entity indicating that the scheduling entity can allocate resources associated with a second RAT (e.g., NR). The method also includes receiving a request for resources from the scheduled entity that corresponds to a sidelink communication associated with the second RAT, and providing a grant of resources to the scheduled entity that includes a second RAT-specific frequency for transmitting the sidelink communication.

In another aspect, a scheduling entity operating according to a first RAT (e.g., LTE) is disclosed, which can include each of a transmitting circuitry, a receiving circuitry, and a grant circuitry. For this example, the transmitting circuitry can be configured to transmit an SIB to a scheduled entity from the scheduling entity in which the SIB indicates that the scheduling entity can allocate resources associated with a second RAT (e.g., NR). The receiving circuitry can be configured to receive a request for resources from the scheduled entity corresponding to a sidelink communication associated with the second RAT, whereas the grant circuitry can be configured to provide a grant of resources to the scheduled entity that includes a second RAT-specific frequency for transmitting the sidelink communication.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
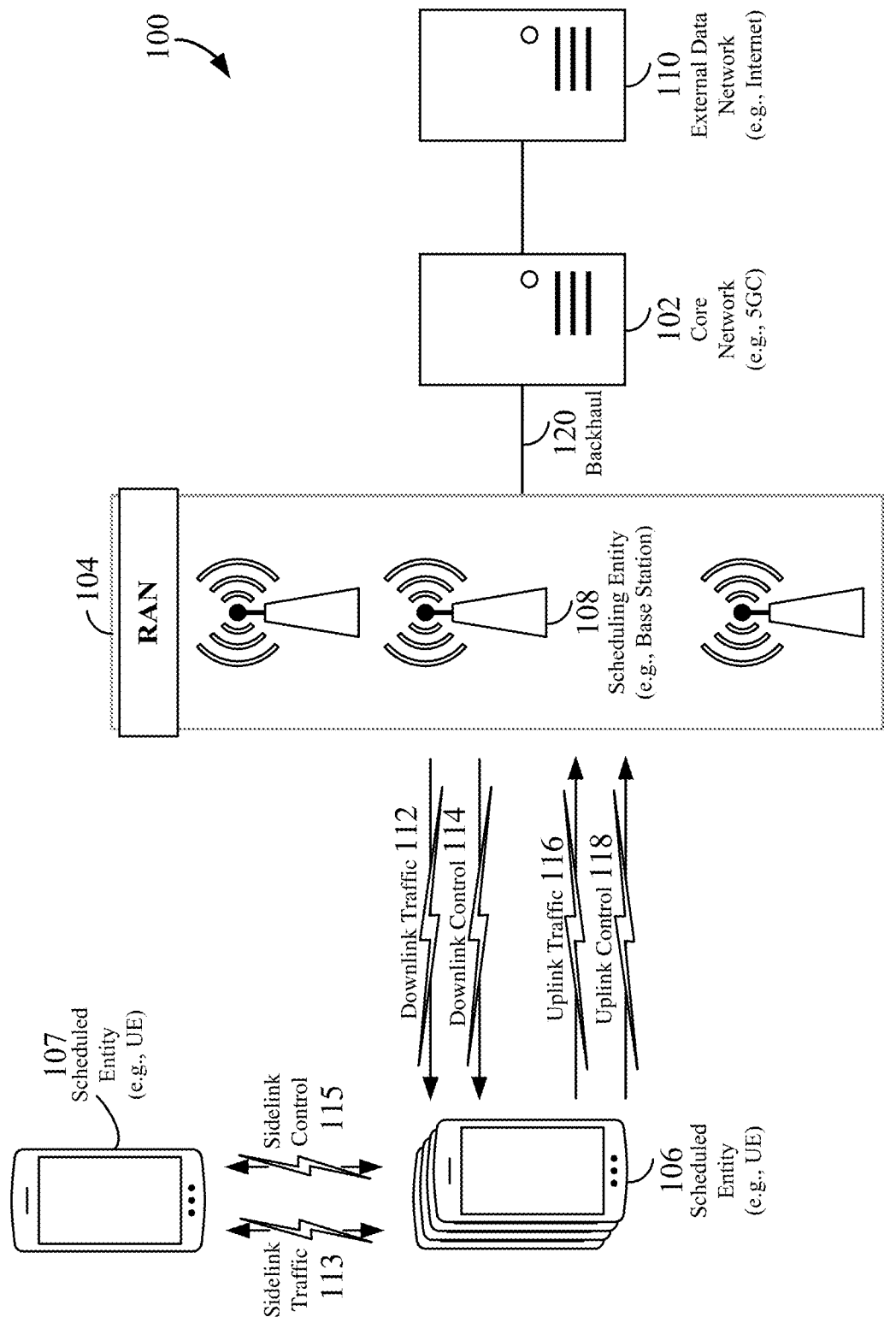
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects disclosed herein are generally directed towards a network-assisted sidelink scheduling operation associated with a particular radio access technology (RAT) that can be used by legacy base stations associated with a different RAT. Here, it should be appreciated that a RAT generally refers to the type of technology or communication standard utilized for radio access and communication over a wireless air interface.

In a particular aspect, a network-assisted New Radio (NR) sidelink scheduling operation is disclosed for legacy base stations (e.g., a Long Term Evolution (LTE) eNB). As previously stated, due to the limited deployment of NR gNBs, it is anticipated that an NR PC5 capable UE will often operate under the coverage of an LTE eNB. Accordingly, it would be desirable to ensure that such UEs may perform NR sidelink communications while operating under the coverage of an LTE eNB.

For instance, in case the network operates a vehicle-to-everything (V2X) sidelink communication in Mode 3 (i.e., a network scheduled mode), NR PC5's operation would be scheduled by the eNB as well. Therefore, in a particular aspect disclosed herein, support is provided for NR PC5 Mode 3 scheduling over legacy air interface between a UE and an LTE eNB (i.e., a legacy LTE-Uu). For example, a scheduled entity (e.g., a UE) is disclosed, wherein the scheduled entity is configured to translate a grant of resources from an LTE configuration to an NR configuration, and then perform a sidelink communication via the NR configuration of resources. A scheduling entity (e.g., an LTE eNB) is also disclosed, wherein the scheduling entity transmits a system information block (SIB) to a scheduled entity indicating that the LTE scheduling entity can allocate NR resources. Upon receiving a request for resources corresponding to an NR sidelink communication, the scheduling entity then provides a grant of resources to the scheduled entity that includes an NR-specific frequency for transmitting the sidelink communication.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
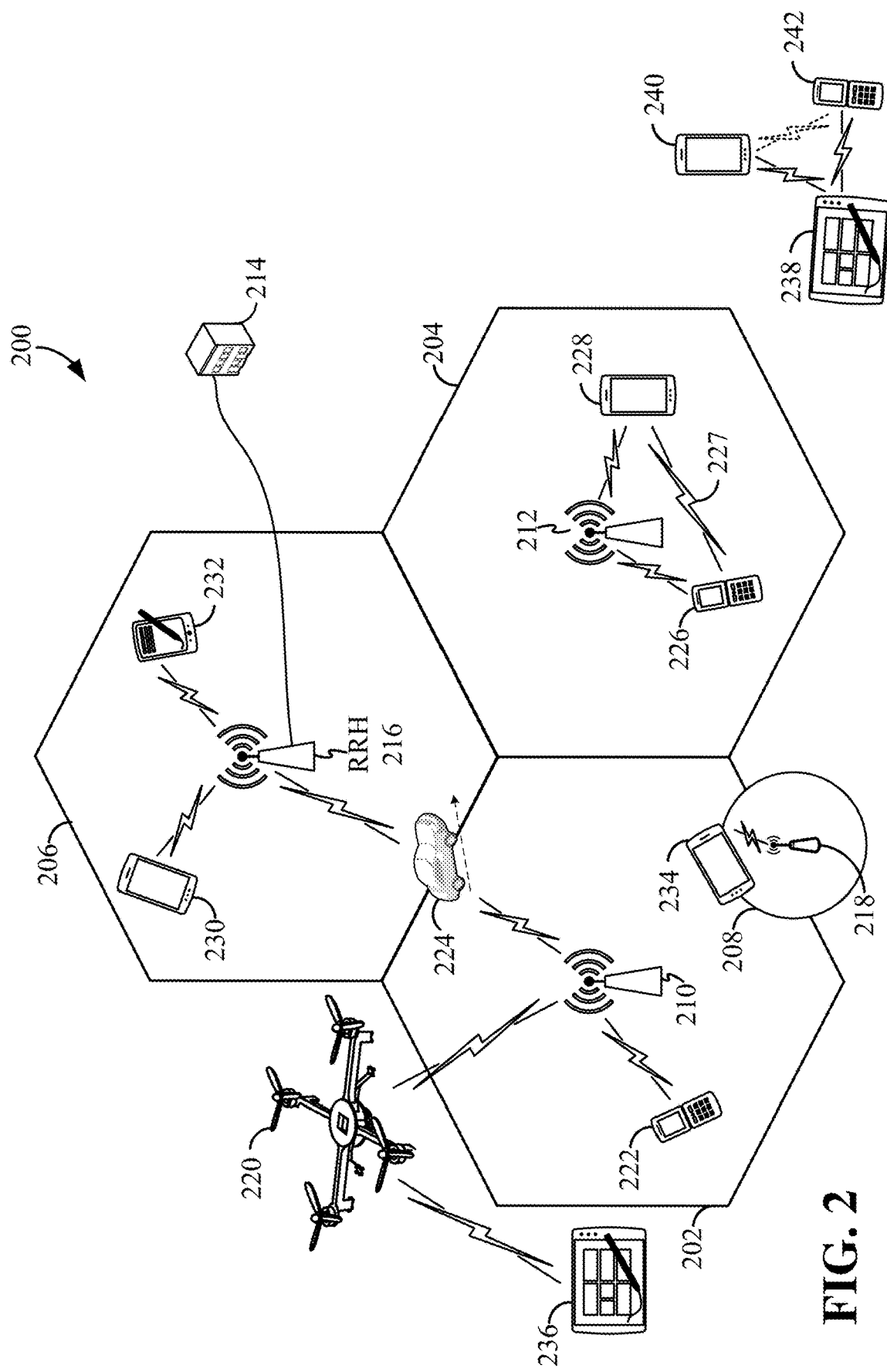
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first scheduled entity 106 and a second scheduled entity 107 may utilize sidelink signals for direct D2D communication. Sidelink signals may include sidelink traffic 113 and sidelink control 115. In some examples, the sidelink control 132 may include synchronization information to synchronize communication on the sidelink channel. In addition, the sidelink control 132 may include scheduling information indicating one or more resource blocks reserved by the transmitting sidelink device to transmit the sidelink traffic 130 to the receiving sidelink device. In some examples, the scheduling information may further include information related to the traffic 130, such as a modulation and coding scheme utilized for the traffic 130. In some examples, the sidelink control 132 may be transmitted within a physical sidelink control channel (PSCCH), while the sidelink data 130 may be transmitted within a physical sidelink shared channel (PSSCH).

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
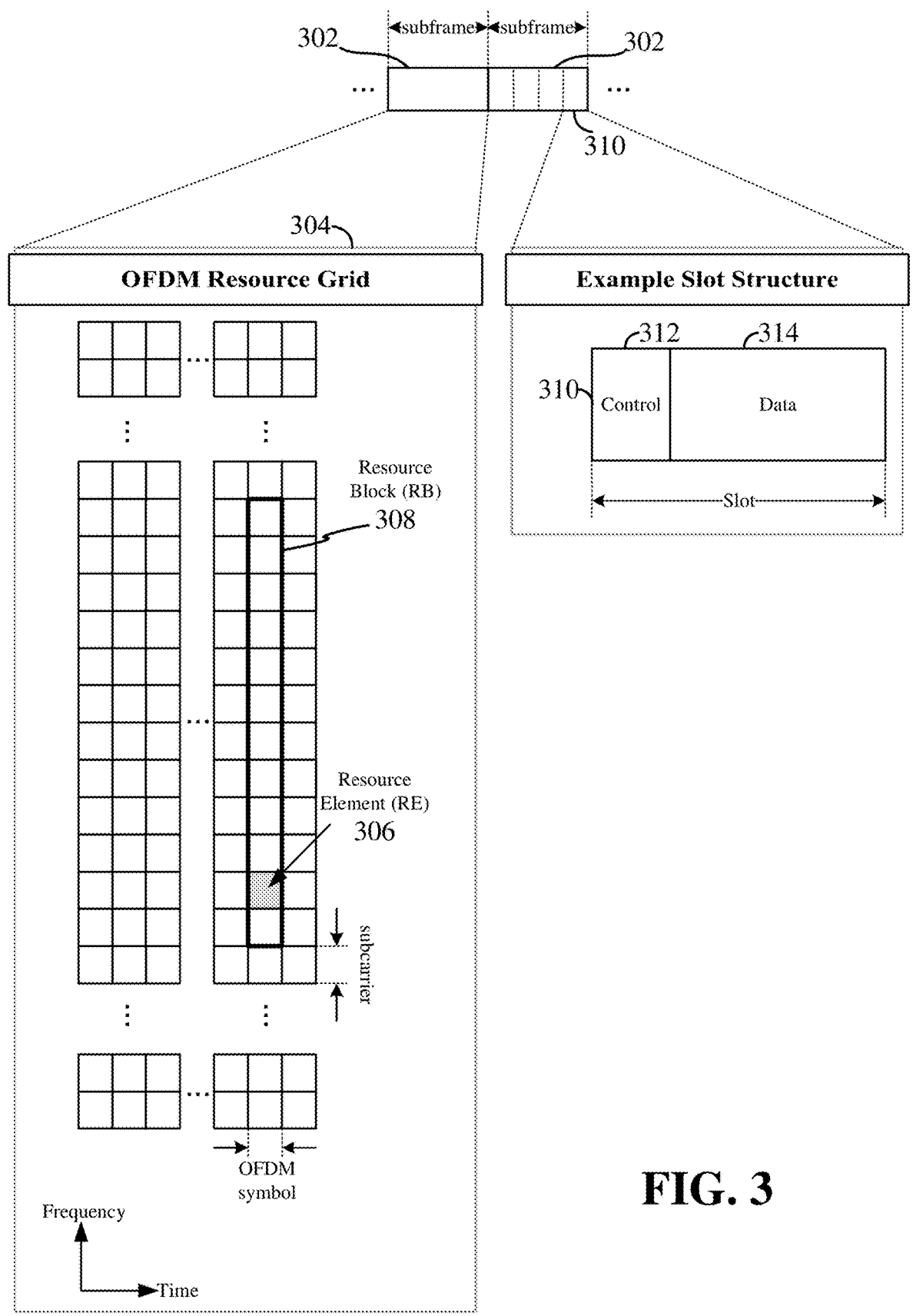
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
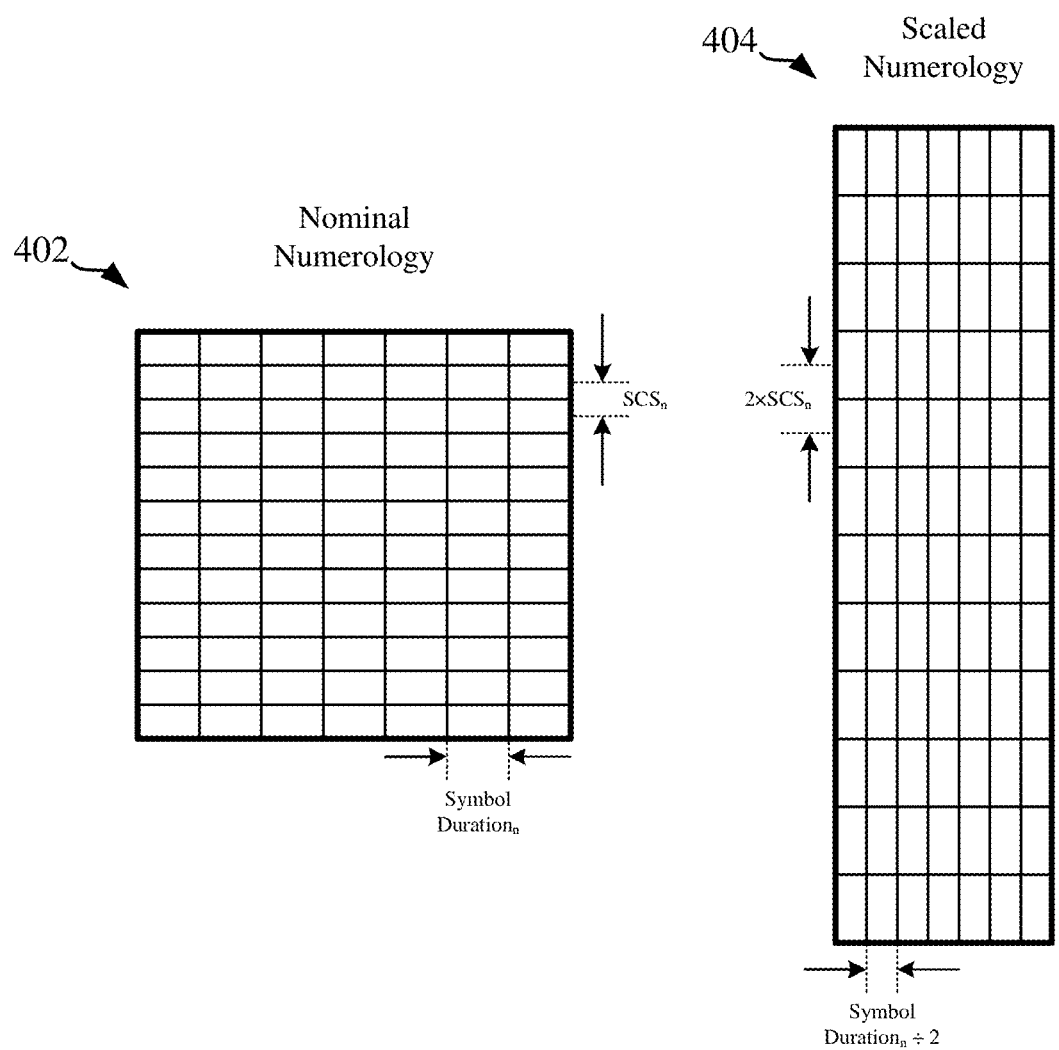
FIG. 4 is a schematic illustration of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology. As one example, the first RB 402 may have a 'nominal' subcarrier spacing ($SCS_n$) of 30 kHz, and a 'nominal' symbol duration$_n$ of 333 μs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 μs.

Figure 5:
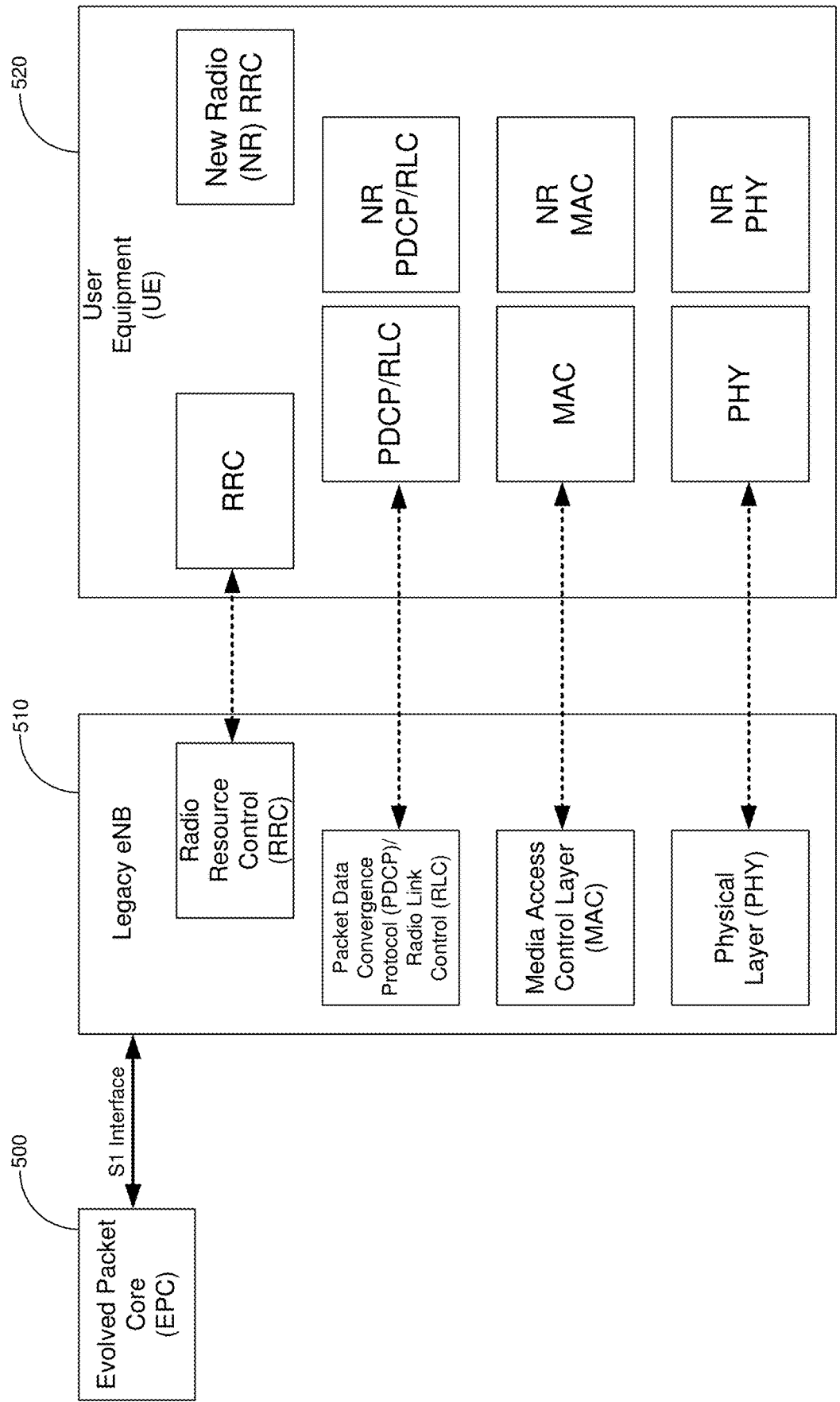
FIG. 5 is block diagram illustrating an exemplary Mode 3 operation under a legacy eNB in accordance with aspects disclosed herein.

As previously stated, various aspects disclosed herein are directed towards a network-assisted New Radio (NR) sidelink scheduling operation for legacy base stations (e.g., a Long Term Evolution (LTE) eNB). In a particular implementation, a vehicle-to-everything (V2X) sidelink communication in Mode 3 (i.e., a network scheduled mode) is contemplated, although the aspects disclosed herein may similarly apply to other types of sidelink communications. A block diagram illustrating an exemplary Mode 3 operation under a legacy eNB is provided in FIG. 5. For this particular example, a legacy eNB 510 interfaces with an Evolved Packet Core (EPC) 500 via an S1 interface and with a user equipment (UE) 520 via an LTE Uu interface, wherein it is assumed that the legacy eNB 510 is an LTE eNB and that the UE 520 is an NR PC5 capable UE. Moreover, it is assumed that the UE 520 is configured for both LTE-V2X (i.e., Rel-14/15) and NR-V2X (i.e., Rel-16), and that UE 520 is further configured to detect the capability of legacy eNB 510 via a system information block (SIB) provided by the legacy eNB 510. Here, since it would be desirable to have the NR PC5 operation of UE 520 scheduled by the legacy eNB 510, an aspect disclosed herein is directed towards reusing the LTE-Uu interface to support NR PC5 Mode 3 scheduling. To this end, it is noted that no change of the over-the-air (OTA) signaling/messaging format is particularly desired, and a potential software/logic upgrade at the legacy eNB 510 may or may not be needed.

Figure 6:
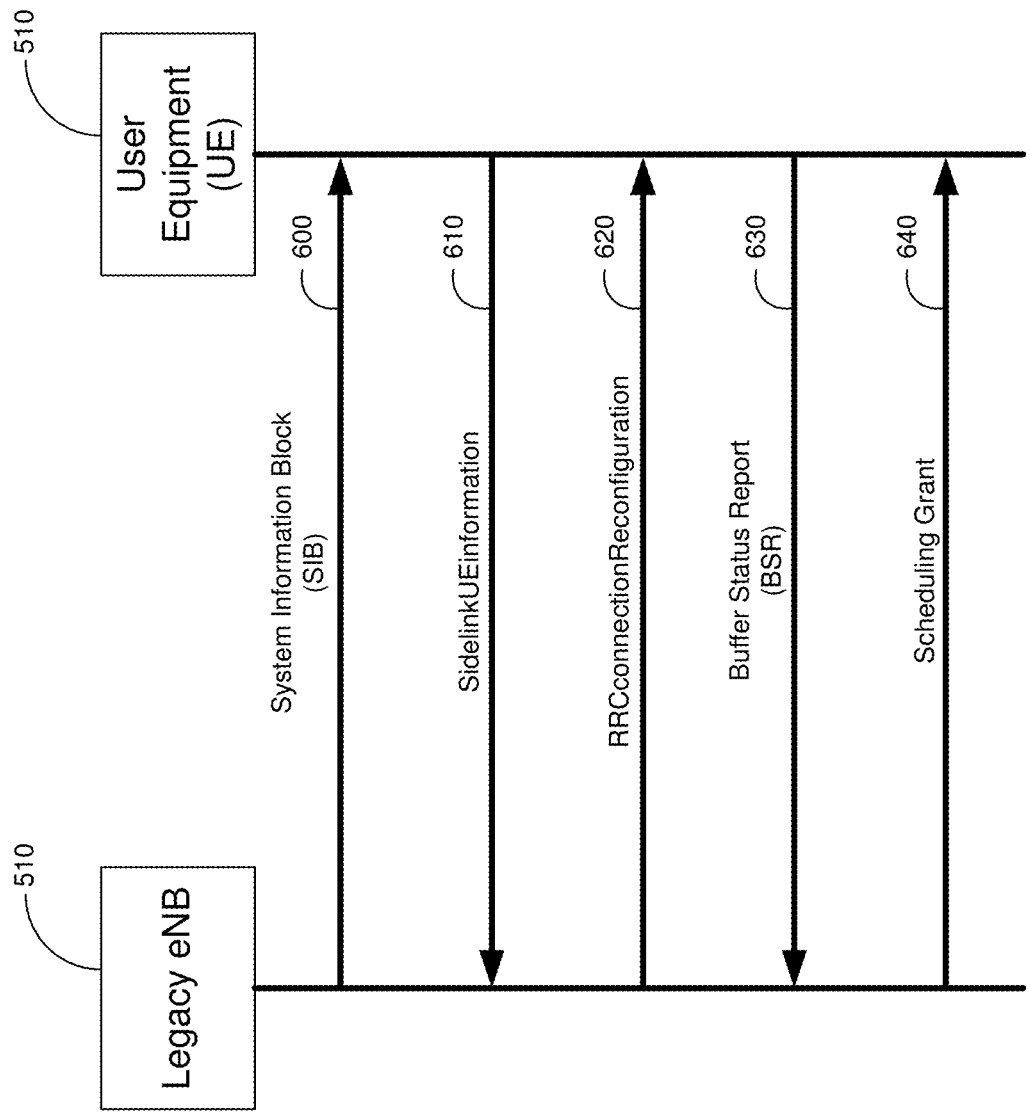
FIG. 6 illustrates an exemplary Mode 3 scheduling of a user equipment (UE) by a legacy eNB in accordance with aspects disclosed herein.

In a particular aspect disclosed herein, it is assumed that the current configuration (e.g., SIB, Radio Resource Control (RRC) signaling) and scheduling operation of an LTE eNB can remain the same. For reference, an overview of an exemplary Mode 3 scheduling of the UE 520 by the legacy eNB 510 is provided in FIG. 6. As illustrated, the legacy eNB 510 begins the scheduling process by transmitting an SIB to the UE 520 at communication 600, wherein the SIB indicates a common transmission configuration and common pool. The UE 520 then responds by sending the legacy eNB 510 SidelinkUEinformation at communication 610, wherein the SidelinkUEinformation indicates the destinations and frequency for transmission. At communication 620, the legacy eNB 510 then provides the UE 520 with an RRCConnectionReconfiguration, which indicates a modulation and coding scheme (MCS) configuration and scheduled pool for potential grants. The scheduling process then proceeds to communication 630 where the UE 520 provides the legacy eNB 510 with a buffer status report (BSR), which provides an indication of the buffered data waiting to be scheduled. At communication 640 the process then concludes with the legacy eNB 510 providing the UE 520 with a scheduling grant (i.e., a frequency/time block for the sidelink communication).

In an aspect disclosed herein, it is contemplated that support for NR PC5 Mode 3 via legacy signaling is achieved by mapping the LTE-Uu signaling to control NR PC5 operation. Desirably, it is noted that such a scheme does not require a change in OTA messaging/signaling, although implementations are also contemplated where the internal logic of a legacy eNB may be updated to understand NR PC5 logic. It is also contemplated that a UE may obtain configuration and scheduling via LTE-Uu, and apply those to NR PC5, which is possible because the actual sidelink transmission does not pass through the eNB. In a first exemplary implementation, it is thus contemplated that operation at the legacy eNB remains the same and that the eNB need not be aware that the UE is requesting NR PC5 resources (i.e. the eNB takes NR PC5 resources as another LTE resources pool, wherein the UE interprets the scheduling accordingly for NR PC5 operation). In a second exemplary implementation, however, it is contemplated that the eNB and UE have a consistent way of mapping to NR PC5 operation parameters from existing LTE-Uu signaling designed for LTE PC5 operation.

Figure 7:
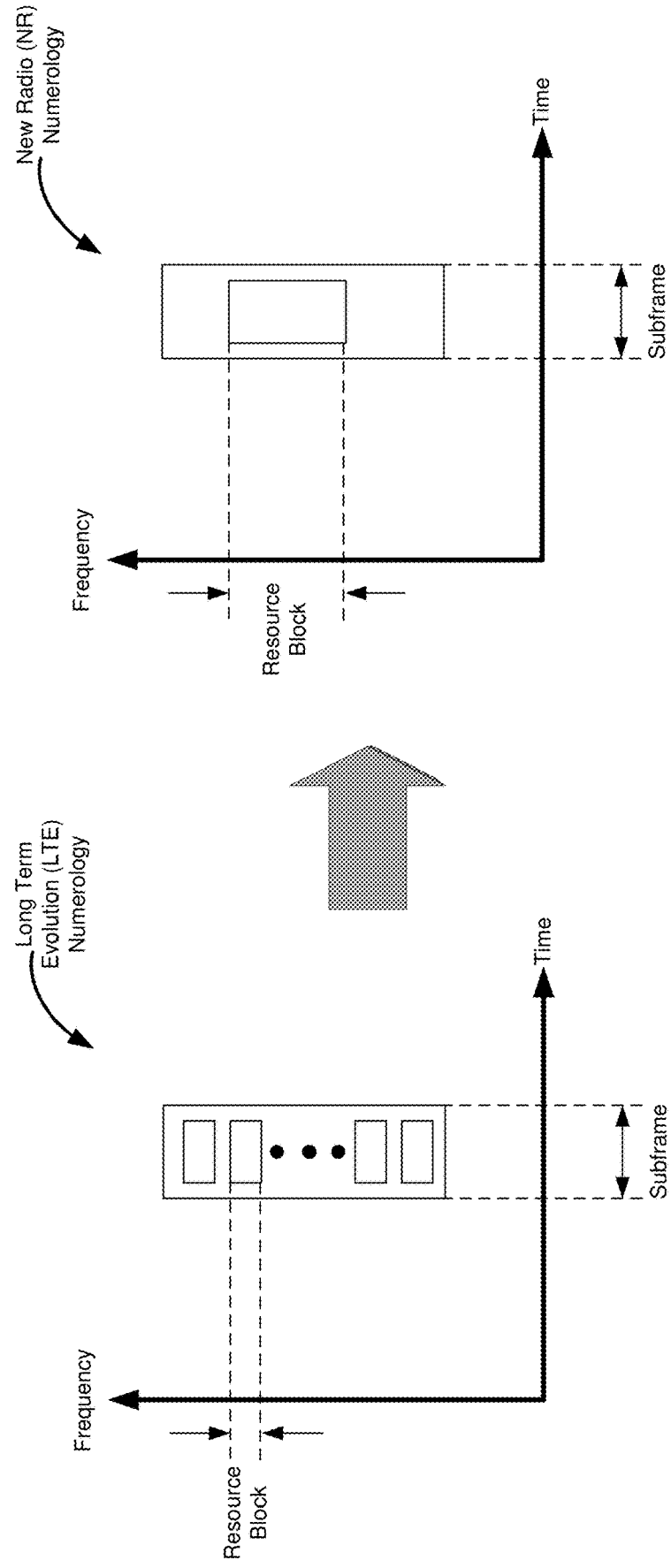
FIG. 7 is an illustration of an exemplary OFDM numerology translation from Long Term Evolution (LTE) to New Radio (NR) in accordance with aspects disclosed herein.

Referring next to FIG. 7, an illustration is provided of an exemplary OFDM numerology translation from LTE to NR in accordance with aspects disclosed herein. Here, it is assumed that an LTE resource is given as one-shot or periodic (SPS), and that a grant unit is one subframe with N resource blocks. Also, whereas the LTE OFDM numerology utilizes a fixed subcarrier spacing (SCS) of 15 KHz, an NR UE may use different SCS values (e.g., 15 KHz, 30 KHz, or 60 KHz) for a given spectrum. Furthermore, it is contemplated that an NR UE may use part or all of the resources given by the legacy eNB for its sidelink transmission. The NR OFDM numerology is also flexible with respect to transmission time intervals (TTIs). For instance, the NR TTI may be 1 ms, 0.5 ms, or 0.25 ms (e.g., slot or mini-slot), wherein the NR UE can choose to select one or more TTI from a given grant.

A particular numerology translation in accordance with aspects disclosed herein is now provided. With respect to the time-domain, it is contemplated that a legacy resource pool may define the NR resource pool based on subframe, wherein the legacy eNB allocates the subframe with a gap of 4 ms, and wherein the UE maps it to an NR time unit (slot) and uses part or the whole subframe for an NR V2X transmission. With respect to the frequency-domain, it is contemplated that the starting subchannel and size of the subchannel indicates the frequency allocation in LTE resource blocks, wherein the UE then determines its preferred SCS, which may be other than 15 kHz, and occupies the given spectrum with NR-compatible frequency settings.

Aspects disclosed herein thus contemplate how a UE may utilize LTE resources for an NR transmission (e.g., by using a translation of LTE to NR numerology). Aspects disclosed herein also contemplate how to make an eNB allocate the right amount of resources for an NR sidelink communication. For instance, if the MCS is configured by the eNB according to an LTE transmission scheme, it is contemplated that the NR UE may use this MCS to estimate the eNB resource allocation. In the BSR transmitted to the legacy eNB, the UE may then perform a "fake" reporting of "X bytes" to trigger the legacy eNB to give an appropriate LTE resource grant, which allows the UE to transmit "Y bytes" in its NR numerology with a UE-desired MCS (e.g., a table may be used to calculate how much data to report and translate to LTE reporting volume. Also, if the MCS is not configured by an eNB, then the NR UE may use a self-selected LTE MCS to estimate the eNB resource allocation and adjust its BSR reporting accordingly to trigger the eNB to allocate appropriate resource grant.

Various other aspects are also considered herein. For instance, how to translate the 5G QoS Indicator (5QI) requirement to a ProSe Per-Packet Priority (PPPP)/ProSe Per-Packet Reliability (PPPR) mapping of a Logical Channel Group Identifier (LCGID) is considered, wherein such mapping may be pre-defined and provided to the NR V2X UE (e.g., either standardized or pre-configured). Aspects disclosed herein also consider how a UE may determine whether to use NR or LTE, assuming that the eNB does not know. To this end, it is contemplated that such determination might be made according to a configuration of the V2X control function (e.g., based on a service identifier, provider service identifier (PSID), etc.), and/or the determination can be based on an upper mapping between service and frequency (e.g., from V2X control function and some frequencies that are known for NR usage only). Also, when a legacy resource is allocated for broadcast only, it is contemplated that the UE can use it for broadcast/multicast/unicast.

As previously stated, aspects disclosed herein also contemplate solutions where the legacy eNB and UE perform the aforementioned mapping in a coordinated manner without a signaling format change. For such implementation, both the UE and the legacy eNB might be configured to have prior knowledge that some frequencies are for 5G V2X usage. With respect to configuration (i.e., SIB & RRC signaling), it is contemplated that a gNB may include those 5G frequencies in the SIB so that the NR V2X UE understands that this legacy eNB can allocate NR V2X resources as well as LTE, for example. This configuration may also include dedicated RRC signaling. For instance, in SidelinkUEinfo, the UE may request 5G-compatiable resources in one of the 5G frequencies. The legacy eNB may then configure the scheduled pool, and provide an MCS having an LTE format, with the understanding that this resource is to be used for 5G transmissions. With respect to scheduling operation (e.g., BSR, Scheduling Grant, etc.), when a UE sends a BSR which includes a destination index pointing to a 5G frequency and indicates X bytes of 5G data to be transmitted, it is contemplated that the legacy eNB may be configured to understand that the buffer data is supposed to be transmitted in 5G V2X format. Accordingly, the legacy eNB may then allocate a resource grant having a size which is appropriate for the transmitting in a 5G format for the corresponding amount.

Figure 8:
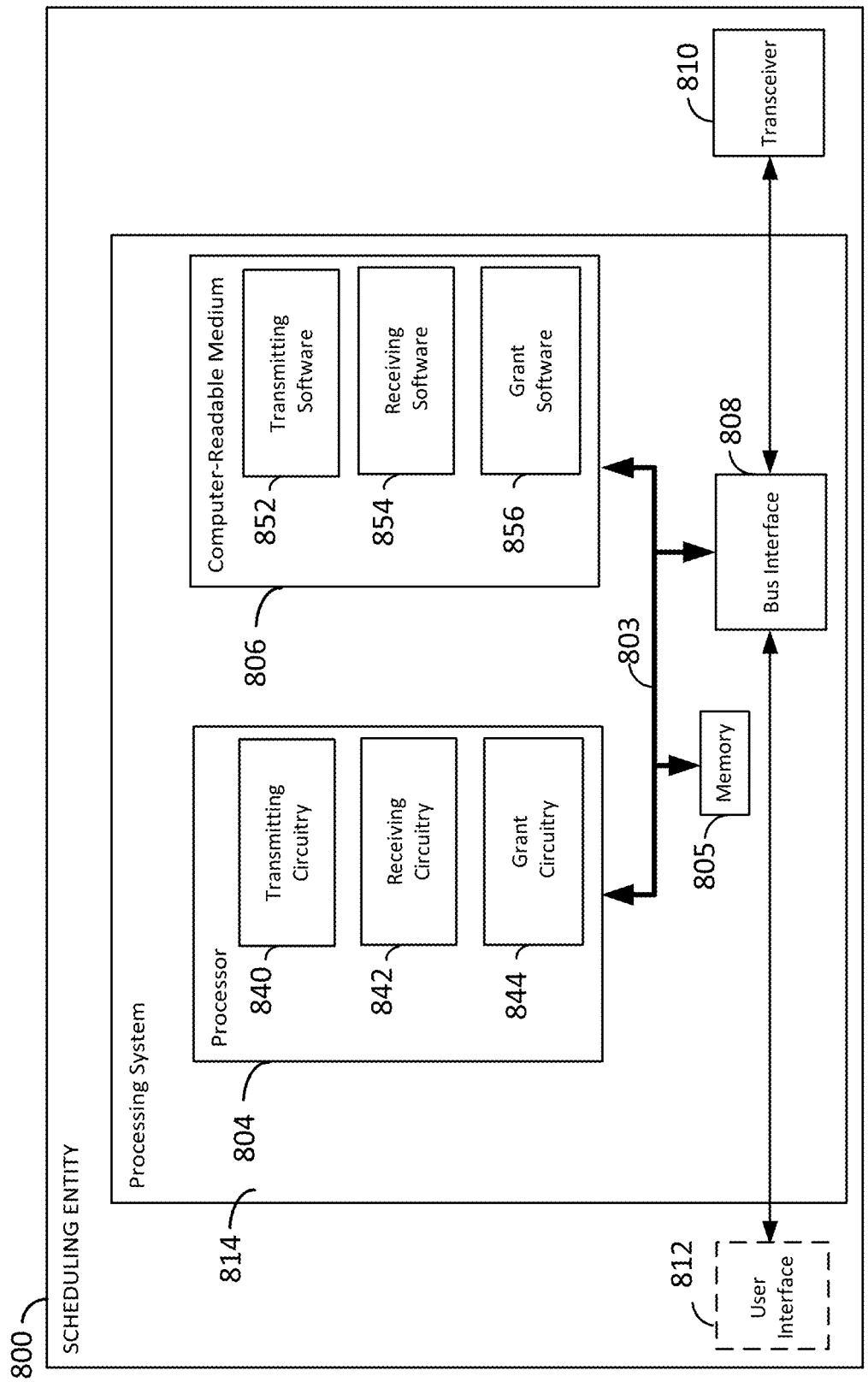
FIG. 8 is a block diagram illustrating an example of a hardware implementation for a scheduling entity employing a processing system in accordance with aspects disclosed herein.

FIG. 8 is a block diagram illustrating an example of a hardware implementation for a legacy scheduling entity 800 (e.g., an LTE scheduling entity) employing a processing system 814. For example, the scheduling entity 800 may be a user equipment (UE) as illustrated in any one or more of the FIGs. disclosed herein. In another example, the scheduling entity 800 may be a base station as also illustrated in any one or more of the FIGs. disclosed herein.

The scheduling entity 800 may be implemented with a processing system 814 that includes one or more processors

804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below and illustrated in FIG. 9 and/or FIG. 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include a transmitting circuitry 840 configured for various functions, including, for example, to transmit a system information block (SIB) to a scheduled entity indicating that the scheduling entity 800 can allocate New Radio (NR) resources. As illustrated, the processor 804 may also include a receiving circuitry 842 configured for various functions. For instance, the receiving circuitry 842 may be configured to receive a request for resources from the scheduled entity that corresponds to an NR sidelink communication (e.g., a vehicle-to-everything (V2X) communication). The processor 804 may further include grant circuitry 844 configured for various functions, including, for example, to provide a grant of resources to the scheduled entity that includes an NR-specific frequency for transmitting the sidelink communication. It should also be appreciated that, the combination of the transmitting circuitry 840, the receiving circuitry 842, and the grant circuitry 844 may be configured to implement one or more of the functions described herein.

Various other aspects for scheduling entity 800 are also contemplated. For instance, it is contemplated that the receiving circuitry 842 may be configured to receive the request for resources via a radio resource control (RRC) message. Within such embodiment, the receiving circuitry 842 may be further configured to receive a buffer status report (BSR) that includes a destination index pointing to the NR-specific frequency for receiving the sidelink communication. It is also contemplated that the NR-specific frequency for receiving the sidelink communication may be commonly known by the LTE scheduling entity and the scheduled entity Referring back to the remaining components of scheduling entity 800, it should be appreciated that the processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include transmitting software 852 configured for various functions, including, for example, to transmit an SIB to a scheduled entity indicating that the scheduling entity 800 can allocate NR resources. As illustrated, the computer-readable storage medium 806 may also include receiving software 854 configured for various functions. For instance, the receiving software 854 may be configured to receive a request for resources from the scheduled entity that corresponds to an NR sidelink communication (e.g., a V2X communication). The computer-readable storage medium 806 may further include grant software 856 configured for various functions, including, for example, to provide a grant of resources to the scheduled entity that includes an NR-specific frequency for transmitting the sidelink communication.

In a particular configuration, it is also contemplated that the scheduling entity 800 includes means for transmitting an SIB to a scheduled entity indicating that the scheduling entity 800 can allocate NR resources; means for receiving a request for resources from the scheduled entity that corresponds to an NR sidelink communication (e.g., a V2X communication); and means for providing a grant of resources to the scheduled entity that includes an NR-specific frequency for transmitting the sidelink communication. In one aspect, the aforementioned means may be the processor(s) 804 configured to perform the functions recited by the aforementioned means. In another aspect, the aforementioned means may be a circuit or any apparatus configured to perform the functions recited by the aforementioned means.

Figure 9:
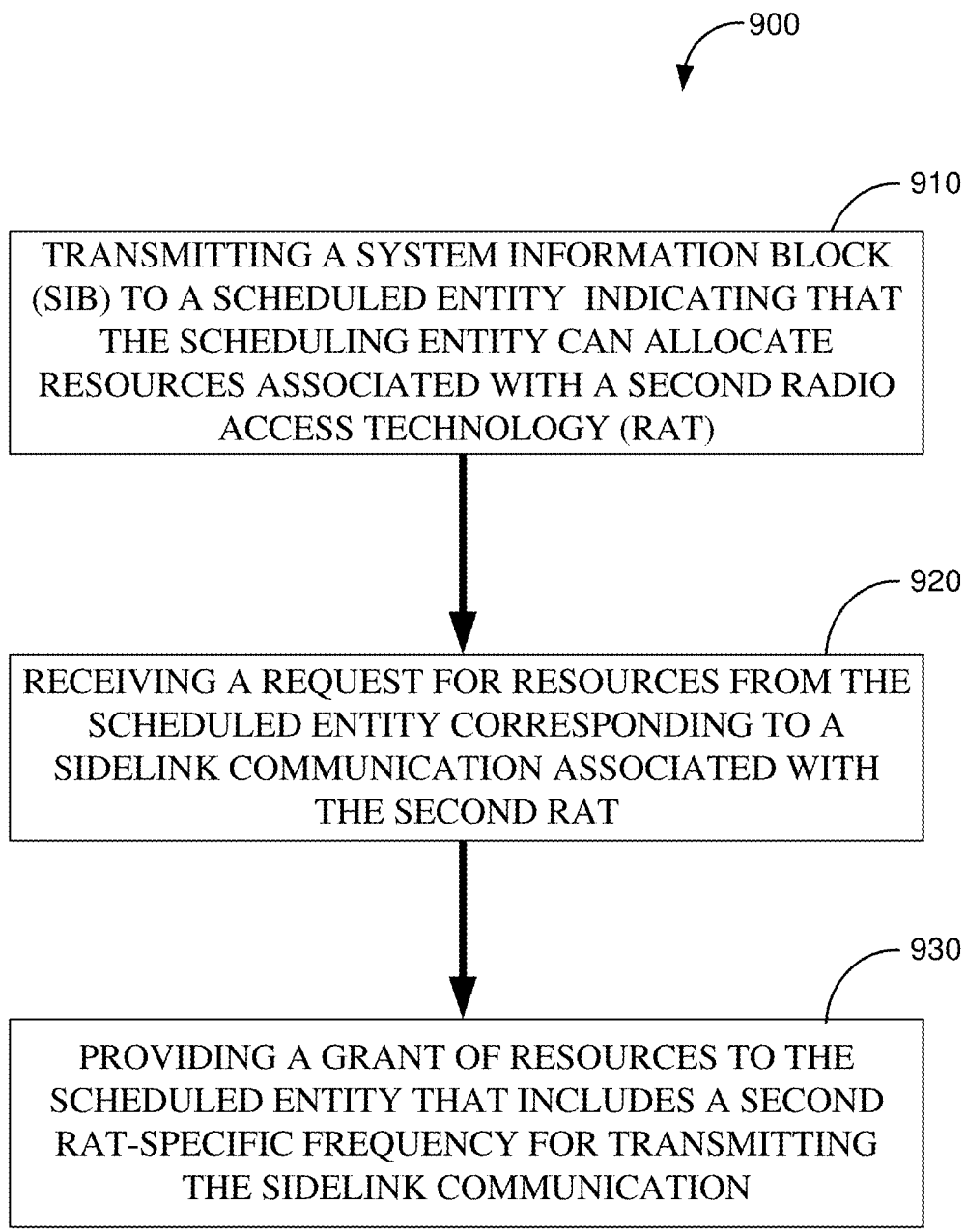
FIG. 9 is a flow chart illustrating an exemplary scheduling entity process that facilitates some aspects of the disclosure.
Figure 10:
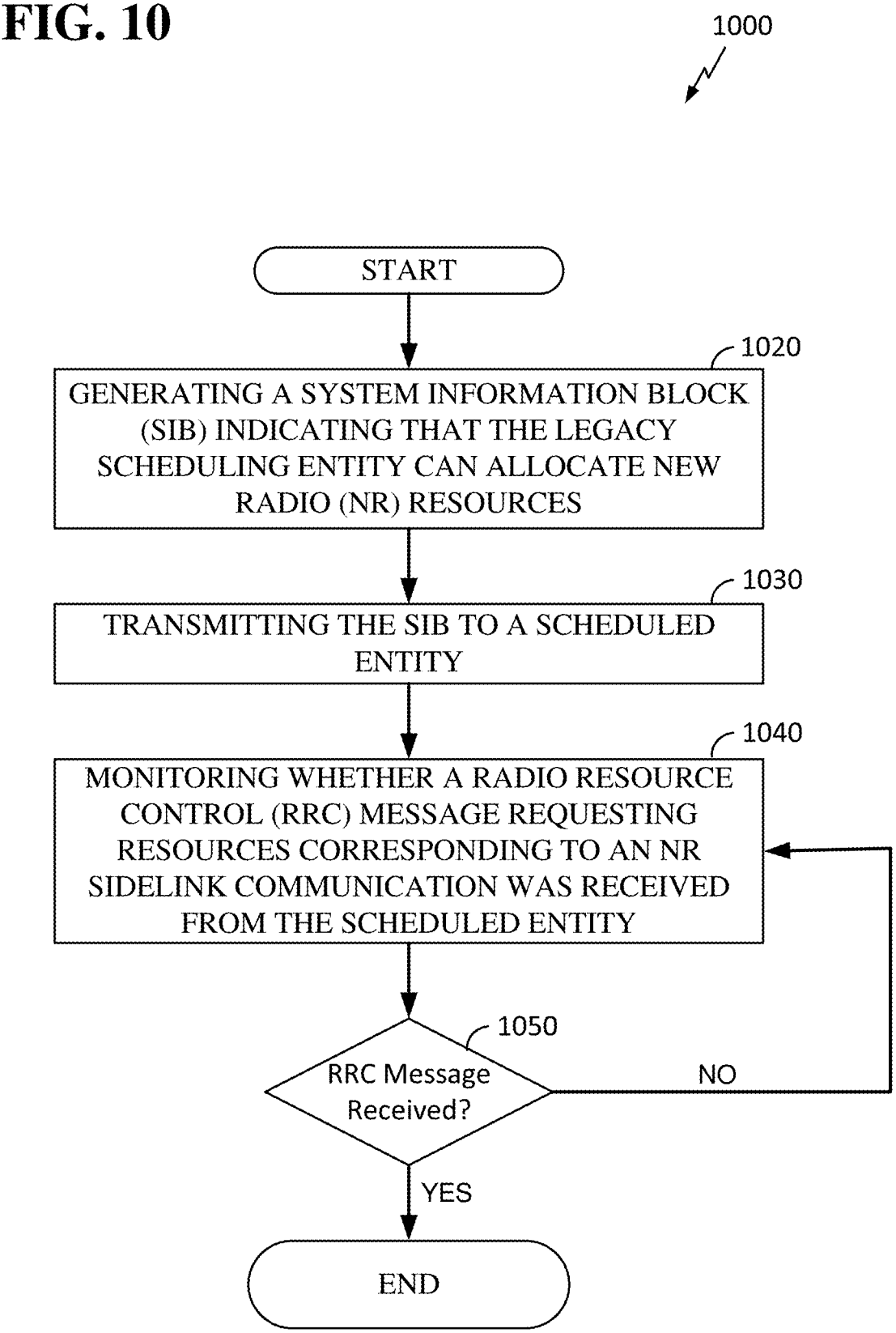
FIG. 10 is a flow chart illustrating an exemplary process that facilitates a network-assisted NR sidelink scheduling operation from a legacy base station in accordance with aspects disclosed herein.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein and utilizing, for example, the processes and/or algorithms described in relation to FIG. 9 and/or FIG. 10.

In FIG. 9, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for implementation of all embodiments. In some examples, the process 900 may be carried out by the scheduling entity 800 illustrated in FIG. 8, wherein the scheduling entity 800 operates according to a first RAT (e.g., LTE). In some examples, the process 900 may be carried out by any suitable apparatus or means for carrying out the functions or algorithm described below.

Process 900 begins at block 910 with the scheduling entity 800 (e.g., an LTE scheduling entity) transmitting an SIB to a scheduled entity indicating that the scheduling entity 800 can allocate resources associated with a second RAT (e.g., NR resources). Process 900 then proceeds to block 920 with the scheduling entity 800 receiving a request for resources from the scheduled entity corresponding to a sidelink communication (e.g., a V2X communication) associated with the second RAT. Process 900 then concludes at block 930 where the scheduling entity 800 provides a grant of resources to the scheduled entity that includes a second RAT-specific frequency for transmitting the sidelink communication.

Referring next to FIG. 10, a flow chart is provided illustrating an exemplary process that facilitates a network-assisted NR sidelink scheduling operation from a legacy base station (e.g., an LTE eNB) in accordance with aspects disclosed herein. As described below, some or all illustrated features may be omitted in a particular implementation within the scope of the present disclosure, and some illustrated features may not be required for implementation of all embodiments. In some examples, the process 1000 may be carried out by the scheduling entity 800 illustrated in FIG. 8. In some examples, the process 1000 may be carried out by any suitable apparatus or means for carrying out the functions or algorithm described below.

Process 1000 may, for example, be performed by a scheduling entity 800 operating as a legacy scheduling entity (e.g., an LTE eNB). At block 1020, the scheduling entity 800 generates an SIB indicating that the scheduling entity 800 can allocate NR resources, wherein the SIB is subsequently transmitted to a scheduled entity at block 1030. Process 1000 then proceeds to block 1040 where the scheduling entity 800 monitors whether an RRC message requesting resources corresponding to an NR sidelink communication was received from the scheduled entity. At block 1050, the scheduling entity 800 determines whether an RRC message has been received. If an RRC message has indeed been received from the scheduled entity, process 1000 may be concluded as the scheduling entity 800 has provided a grant of resources to the scheduled entity that includes an NR-specific frequency for transmitting the NR sidelink communication. Otherwise, if an RRC message is not received, process 1000 may loop back to block 1040, for example, where the scheduling entity 800 may continue to monitor whether an RRC message was received from the scheduled entity.

Figure 11:
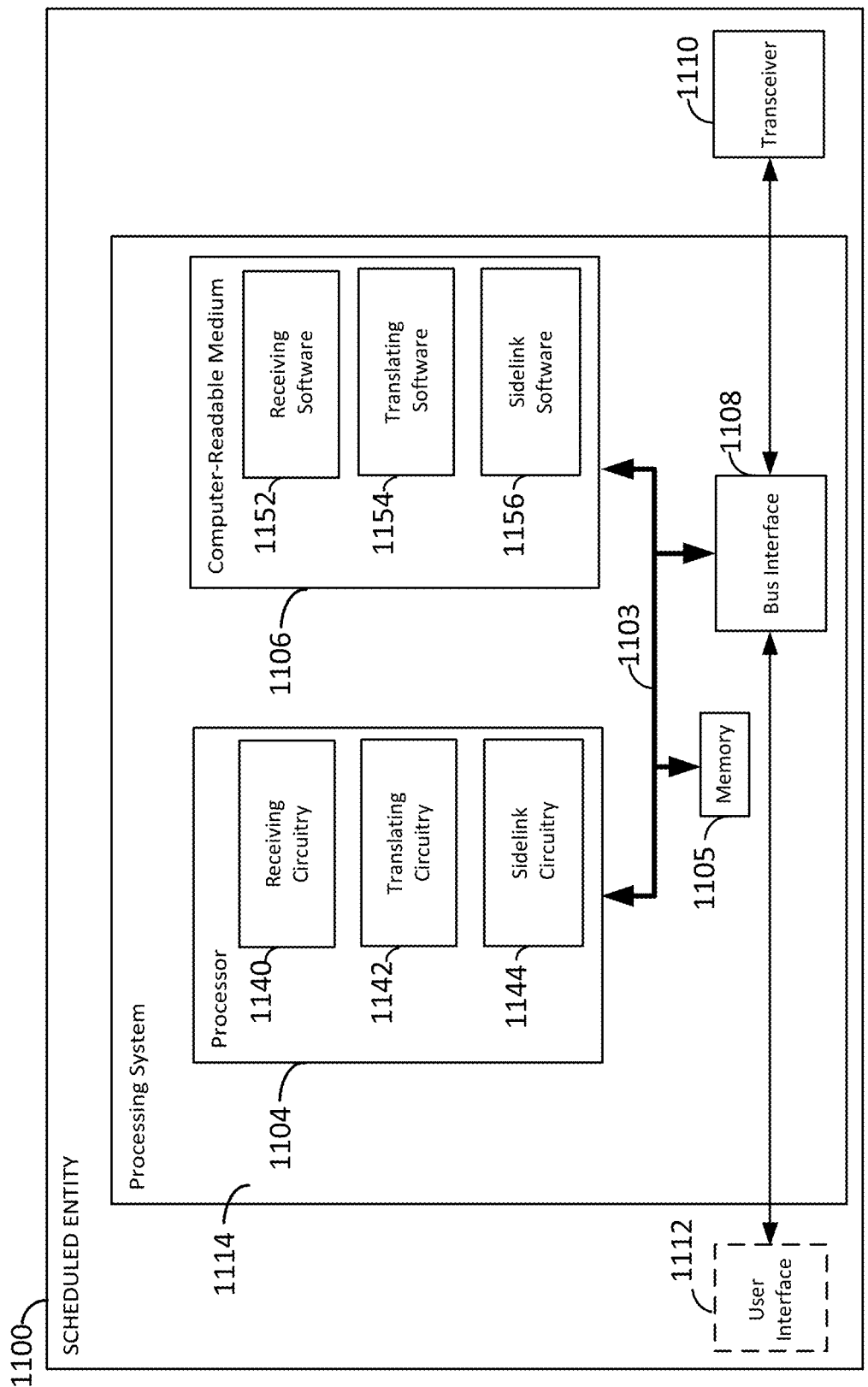
FIG. 11 is a block diagram illustrating an example of a hardware implementation for a scheduled entity employing a processing system in accordance with aspects disclosed herein.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a UE as illustrated in any one or more of the FIGs. disclosed herein.

The processing system 1114 may be substantially the same as the processing system 814 illustrated in FIG. 8, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 8. That is, the processor 1104, as utilized in a scheduled entity 1100, may be used to implement any one or more of the processes described below and illustrated in the various figures.

In some aspects of the disclosure, the processor 1104 may include a receiving circuitry 1140 configured for various functions, including, for example, to receive a grant of resources from a Long Term Evolution (LTE) scheduling entity. As illustrated, the processor 1104 may also include translating circuitry 1142 configured for various functions. For instance, translating circuitry 1142 may be configured to translate the grant of resources from an LTE configuration of resources to a New Radio (NR) configuration of resources. In a particular implementation, the translating circuitry 1142 may be configured to select one or more transmission time intervals (TTIs) from the grant of resources. The processor 1104 may further include sidelink circuitry 1144 configured for various functions, including, for example, to perform a sidelink communication (e.g., a vehicle-to-everything (V2X) communication) via the NR configuration of resources. For instance, the sidelink circuitry 1144 may be configured to utilize a portion of the grant of resources to transmit the sidelink communication. It should also be appreciated that, the combination of the receiving circuitry 1140, the translating circuitry 1142, and the sidelink circuitry 1144 may be configured to implement one or more of the functions described herein.

Various other aspects for scheduled entity 1100 are also contemplated. For instance, it is contemplated that the translating circuitry 1142 may be configured to convert a fixed subcarrier spacing (SCS) associated with the LTE configuration of resources into a scalable SCS associated with the NR configuration of resources. For this particular implementation, the sidelink circuitry 1144 may then be further configured to perform a sidelink communication by determining a preferred SCS to utilize for the sidelink communication, and scaling the scalable SCS to the preferred SCS.

In another aspect of the disclosure, it is contemplated that scheduled entity 1100 may be further configured to ascertain an estimated amount of resources based on a modulation and coding scheme (MCS), and request the grant of resources according to the estimated amount of resources. Here, it should be appreciated that the MCS may be configured by the LTE scheduling entity or the MCS may be a self-selected MCS. It should also be appreciated that the translating circuitry 1142 may be configured to determine an LTE byte value corresponding to a desired NR byte value for transmitting the sidelink communication in accordance with a transport size associated with the NR configuration of resources. For this implementation, scheduled entity 1100 may be configured to request the grant of resources by transmitting a buffer status report (BSR) based on the LTE byte value to facilitate having the grant of resources compatible with the desired NR byte value for transmitting the sidelink communication. For instance, the translating circuitry 1142 may be configured to ascertain the LTE byte value from a table of LTE byte values and corresponding NR byte values.

In yet another aspect of the disclosure, it is contemplated that the receiving circuitry 1140 may be further configured to receive a system information block (SIB) indicating that the LTE scheduling entity can allocate NR resources. For this implementation, scheduled entity 1100 may then be configured to transmit a radio resource control (RRC) message to solicit the LTE scheduling entity to allocate resources in accordance with an NR-specific frequency for transmitting the sidelink communication. For instance, scheduled entity 1100 may be configured to transmit a buffer status report (BSR) that includes a destination index pointing to the NR-specific frequency for transmitting the sidelink communication. Here, it should also be appreciated that the NR-specific frequency for transmitting the sidelink communication may be commonly known by the LTE scheduling entity and the scheduled entity 1100.

Referring back to the remaining components of scheduled entity 1100, similar to processor 804, processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. Similar to computer-readable medium 806, computer-readable medium 1106 may be a non-transitory computer-readable medium comprising characteristics that are substantially similar. The computer-readable medium 1106 may reside in the processing system 1114, external to the processing system 1114, or distributed across multiple entities including the processing system 1114. It should also be appreciated that, similar to computer-readable medium 806, computer-readable medium 1106 may be embodied in a computer program product comprising characteristics that are substantially similar.

In one or more examples, the computer-readable storage medium 1106 may include receiving software 1152 configured for various functions, including, for example, to receive a grant of resources from an LTE scheduling entity. As illustrated, the computer-readable medium 1106 may also include translating software 1154 configured for various functions. For instance, translating software 1154 may be configured to translate the grant of resources from an LTE configuration of resources to an NR configuration of resources. In a particular implementation, the translating software 1154 may be configured to select one or more TTIs from the grant of resources. The computer-readable medium 1106 may further include sidelink software 1156 configured for various functions, including, for example, to perform a sidelink communication (e.g., a V2X communication) via the NR configuration of resources. For instance, the sidelink software 1156 may be configured to utilize a portion of the grant of resources to transmit the sidelink communication. It should also be appreciated that, the combination of the receiving software 1152, the translating software 1154, and the sidelink software 1156 may be configured to implement one or more of the functions described herein.

In a particular configuration, it is also contemplated that the scheduled entity 1100 includes means for receiving a grant of resources from an LTE scheduling entity; means for translating the grant of resources from an LTE configuration of resources to an NR configuration of resources; and means for performing a sidelink communication via the NR configuration of resources. In one aspect, the aforementioned means may be the processor(s) 1104 configured to perform the functions recited by the aforementioned means. In another aspect, the aforementioned means may be a circuit or any apparatus configured to perform the functions recited by the aforementioned means.

Figure 12:
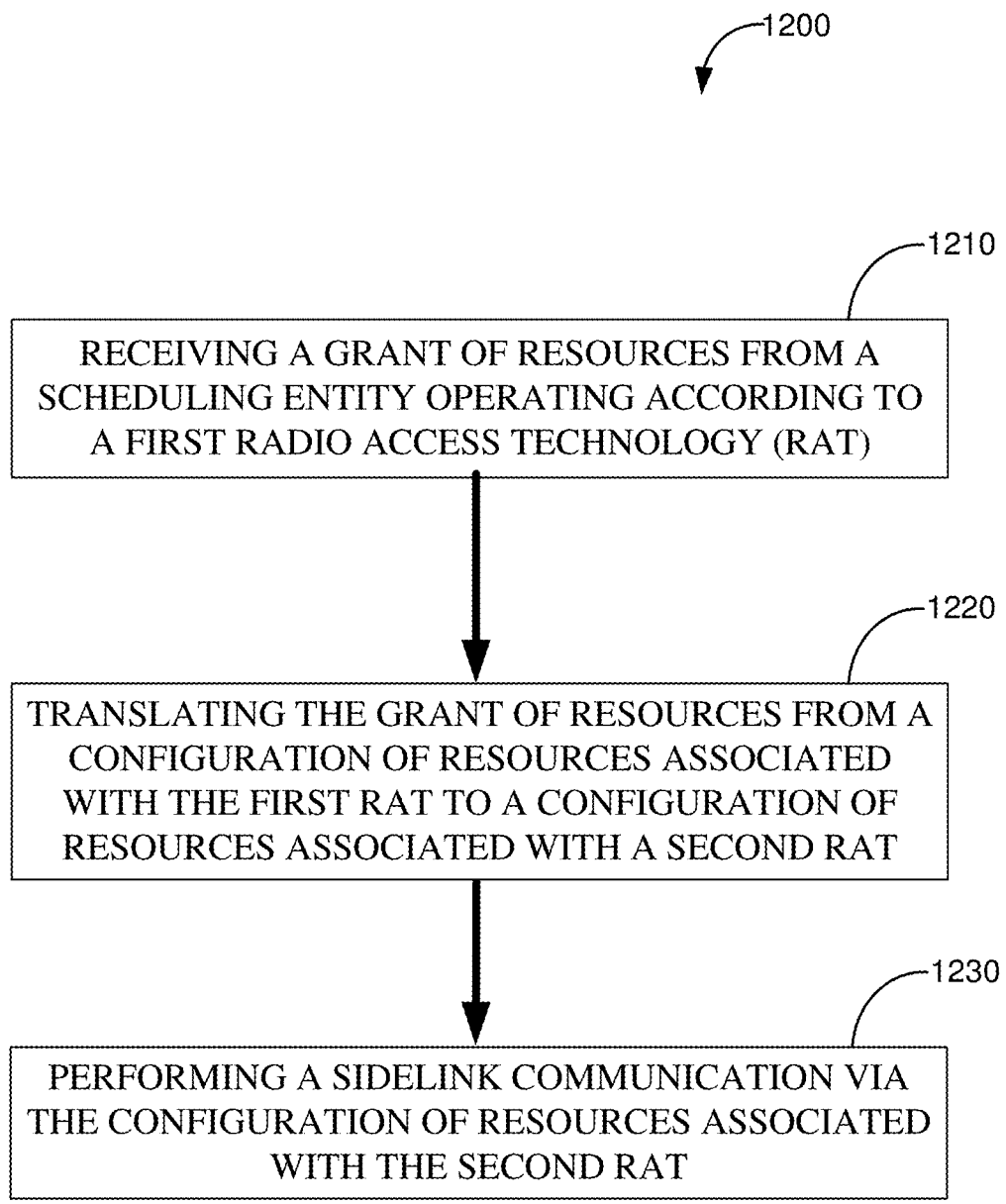
FIG. 12 is a flow chart illustrating an exemplary scheduled entity process that facilitates some aspects of the disclosure.
Figure 13:
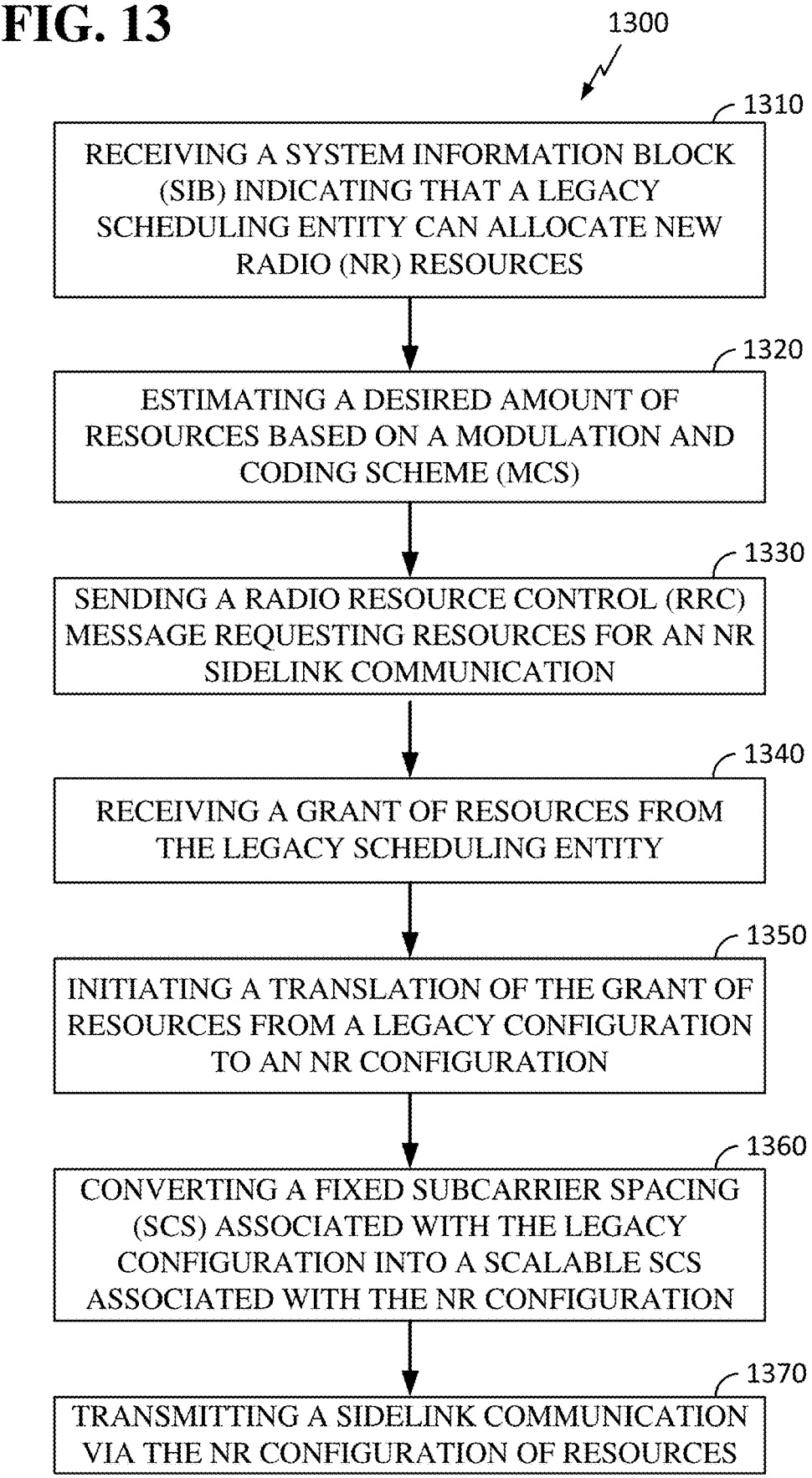
FIG. 13 is a flow chart illustrating an exemplary process that facilitates transmitting an NR sidelink communication via resources provided by a legacy base station in accordance with aspects disclosed herein.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described herein, and utilizing, for example, the processes and/or algorithms described in relation to FIG. 12 and/or FIG. 13.

In FIG. 12, a flow chart is provided, which illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduled entity 1100 illustrated in FIG. 11. In some examples, the process 1200 may be carried out by any suitable apparatus or means for carrying out the functions or algorithm described below.

Process 1200 begins at block 1210 with the scheduled entity 1100 receiving a grant of resources from a scheduling entity operating according to a first RAT (e.g., LTE). Process 1200 then proceeds to block 1220 where the scheduled entity 1100 translates the grant of resources from a configuration of resources associated with the first RAT to a configuration of resources associated with a second RAT (e.g., NR). Process 1200 then concludes at block 1230 where the scheduled entity 1100 performs a sidelink communication (e.g., a V2X communication) via the configuration of resources associated with the second RAT.

Referring next to FIG. 13, a flow chart is provided illustrating an exemplary process that facilitates transmitting an NR sidelink communication via resources provided by a legacy scheduling entity (e.g., an LTE eNB) in accordance with aspects disclosed herein. As described below, some or all illustrated features may be omitted in a particular implementation within the scope of the present disclosure, and some illustrated features may not be required for implementation of all embodiments. In some examples, the process 1300 may be carried out by the scheduled entity 1100 illustrated in FIG. 11. In some examples, the process 1300 may be carried out by any suitable apparatus or means for carrying out the functions or algorithm described below.

Process 1300 begins at block 1310 with the scheduled entity 1100 receiving an SIB indicating that a legacy scheduling entity (e.g., an LTE eNB) can allocate NR resources. At block 1320, the scheduled entity 1100 then estimates a desired amount of resources based on an MCS, wherein the MCS is either a self-selected MCS or an MCS configured by the network. Process 1300 then proceeds to block 1330 where the scheduled entity 1100 sends an RRC message requesting resources for an NR sidelink communication.

At block 1340, the scheduled entity 1100 receives a grant of resources from the legacy scheduling entity, and subsequently proceeds to block 1350 where the scheduled entity 1100 initiates a translation of the grant of resources from a legacy configuration to an NR configuration. For instance, at block 1360, such translation may include converting a fixed SCS associated with the legacy configuration into a scalable SCS associated with the NR configuration. Process 1300 may then conclude at block 1370 where the scheduled entity 1100 transmits a sidelink communication via the NR configuration of resources.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduled entity, comprising:
   receiving a grant of resources from a scheduling entity operating according to a first radio access technology (RAT);
   translating the grant of resources from a configuration of resources associated with the first RAT to a configuration of resources associated with a second RAT, wherein the translating comprises converting a fixed subcarrier spacing (SCS) associated with the configuration of resources associated with the first RAT into a scalable SCS associated with the configuration of resources associated with the second RAT; and performing a sidelink communication via the configuration of resources associated with the second RAT.

2. The method of claim 1, wherein the performing comprises:
determining a preferred SCS to utilize for the sidelink communication; and
scaling the scalable SCS to the preferred SCS.

3. The method of claim 1, wherein the performing comprises utilizing a portion of the grant of resources to transmit the sidelink communication.

4. The method of claim 1, wherein the translating comprises selecting one or more transmission time intervals (TTIs) from the grant of resources.

5. The method of claim 1, wherein the sidelink communication is a vehicle-to-everything (V2X) communication.

6. The method of claim 1, further comprising:
ascertaining an estimated amount of resources based on a modulation and coding scheme (MCS); and
requesting the grant of resources according to the estimated amount of resources.

7. The method of claim 6, wherein the MCS is configured by the scheduling entity.

8. The method of claim 6, wherein the MCS is a self-selected MCS.

9. The method of claim 6, further comprising determining a byte value associated with the first RAT and corresponding to a desired byte value associated with the second RAT for transmitting the sidelink communication in accordance with a transport size associated with the configuration of resources associated with the second RAT, wherein the requesting further comprises transmitting a buffer status report (BSR) based on the byte value associated with the first RAT to facilitate having the grant of resources compatible with the desired byte value associated with the second RAT for transmitting the sidelink communication.

10. The method of claim 9, wherein the determining comprises ascertaining the byte value associated with the first RAT from a table of byte values associated with the first RAT and corresponding byte values associated with the second RAT.

11. The method of claim 1, further comprising:
receiving a system information block (SIB) indicating that the scheduling entity can allocate resources associated with the second RAT; and
transmitting a radio resource control (RRC) message to solicit the scheduling entity to allocate resources in accordance with a second RAT-specific frequency for transmitting the sidelink communication.

12. The method of claim 11, further comprising transmitting a buffer status report (BSR) that includes a destination index pointing to the second RAT-specific frequency for transmitting the sidelink communication.

13. The method of claim 11, wherein the second RAT-specific frequency for transmitting the sidelink communication is commonly known by the scheduling entity and the scheduled entity.

14. A scheduled entity for wireless communication comprising:
a receiving circuitry configured to receive a grant of resources from a scheduling entity operating according to a first radio access technology (RAT);
a translating circuitry configured to translate the grant of resources from a configuration of resources associated with the first RAT to a configuration of resources associated with a second RAT, wherein the translating comprises converting a fixed subcarrier spacing (SCS) associated with the configuration of resources associated with the first RAT into a scalable SCS associated with the configuration of resources associated with the second RAT; and
a sidelink circuitry configured to perform a sidelink communication via the configuration of resources associated with the second RAT.

15. The scheduled entity of claim 14, wherein the sidelink communication is a vehicle-to-everything (V2X) communication.

16. The scheduled entity of claim 14, further configured to:
ascertain an estimated amount of resources based on a modulation and coding scheme (MCS); and
request the grant of resources according to the estimated amount of resources.

17. The scheduled entity of claim 16, wherein the translating circuitry is further configured to determine a byte value associated with the first RAT and corresponding to a desired byte value associated with the second RAT for transmitting the sidelink communication in accordance with a transport size associated with the configuration of resources associated with the second RAT, and wherein the scheduled entity is configured to request the grant of resources by transmitting a buffer status report (BSR) based on the byte value associated with the first RAT to facilitate having the grant of resources compatible with the desired byte value associated with the second RAT for transmitting the sidelink communication.

18. The scheduled entity of claim 17, wherein the translating circuitry is configured to ascertain the byte value associated with the first RAT from a table of byte values associated with the first RAT and corresponding byte values associated with the second RAT.

19. The scheduled entity of claim 14, wherein the receiving circuitry is further configured to receive a system information block (SIB) indicating that the scheduling entity can allocate resources associated with the second RAT, and wherein the scheduled entity is configured to transmit a radio resource control (RRC) message to solicit the scheduling entity to allocate resources in accordance with second RAT-specific frequency for transmitting the sidelink communication.

20. The scheduled entity of claim 19, further configured to transmit a buffer status report (BSR) that includes a destination index pointing to the second RAT-specific frequency for transmitting the sidelink communication.

21. The scheduled entity of claim 19, wherein the second RAT-specific frequency for transmitting the sidelink communication is commonly known by the scheduling entity and the scheduled entity.

22. A method of wireless communication operable at a scheduling entity operating according to a first radio access technology (RAT), comprising:
transmitting a system information block (SIB) to a scheduled entity from the scheduling entity, the SIB indicating that the scheduling entity can allocate resources associated with a second RAT;
receiving a request for resources from the scheduled entity, the request corresponding to a sidelink communication associated with the second RAT;
receiving a buffer status report (BSR) that includes a destination index pointing to a second RAT-specific frequency for receiving sidelink information and an indication of a number of bytes associated with the second RAT that are to be transmitted to the scheduled entity; and providing, to the scheduled entity, a grant of resources that includes the second RAT-specific frequency for transmitting the sidelink communication based on the destination index pointing to the second RAT-specific frequency and the indication of the number of bytes associated with the second RAT.

23. The method of claim 22, wherein the receiving comprises receiving the request for resources via a radio resource control (RRC) message.

24. The method of claim 23, wherein the second RAT-specific frequency for receiving the sidelink communication is commonly known by the scheduling entity and the scheduled entity.

25. The method of claim 22, wherein the first RAT comprises a long term evolution (LTE) network, and wherein the second RAT comprises a new radio (NR) network.

26. A scheduling entity for wireless communication operating according to a first radio access technology (RAT) comprising:

a transmitting circuitry configured to transmit a system information block (SIB) to a scheduled entity from the scheduling entity, the SIB indicating that the scheduling entity can allocate resources associated with a second RAT;

a receiving circuitry configured to:

receive a request for resources from the scheduled entity, the request corresponding to a sidelink communication associated with the second RAT, and receive a buffer status report (BSR) that includes a destination index pointing to a second RAT-specific frequency for receiving sidelink information and an indication of a number of bytes associated with the second RAT that are to be transmitted to the scheduled entity; and a grant circuitry configured to provide, to the scheduled entity, a grant of resources that includes the second RAT-specific frequency for transmitting the sidelink communication based on the destination index pointing to the second RAT-specific frequency and the indication of the number of bytes associated with the second RAT.

27. The scheduling entity of claim 26, wherein the receiving circuitry is configured to receive the request for resources via a radio resource control (RRC) message.

28. The scheduling entity of claim 27, wherein the second RAT-specific frequency for receiving the sidelink communication is commonly known by the scheduling entity and the scheduled entity.

29. The scheduling entity of claim 26, wherein the first RAT comprises a long term evolution (LTE) network, and wherein the second RAT comprises a new radio (NR) network.

* * * * *